Jan. 10, 1950     J. R. FREDERICK     2,493,807
TRANSFER APPARATUS FOR LOADING CONVEYERS
Filed Sept. 13, 1947     3 Sheets-Sheet 1

Inventor
JEAN ROBERT FREDERICK
By Francis J. Klempay
Attorney

Jan. 10, 1950　　J. R. FREDERICK　　2,493,807
TRANSFER APPARATUS FOR LOADING CONVEYERS
Filed Sept. 13, 1947　　3 Sheets-Sheet 2
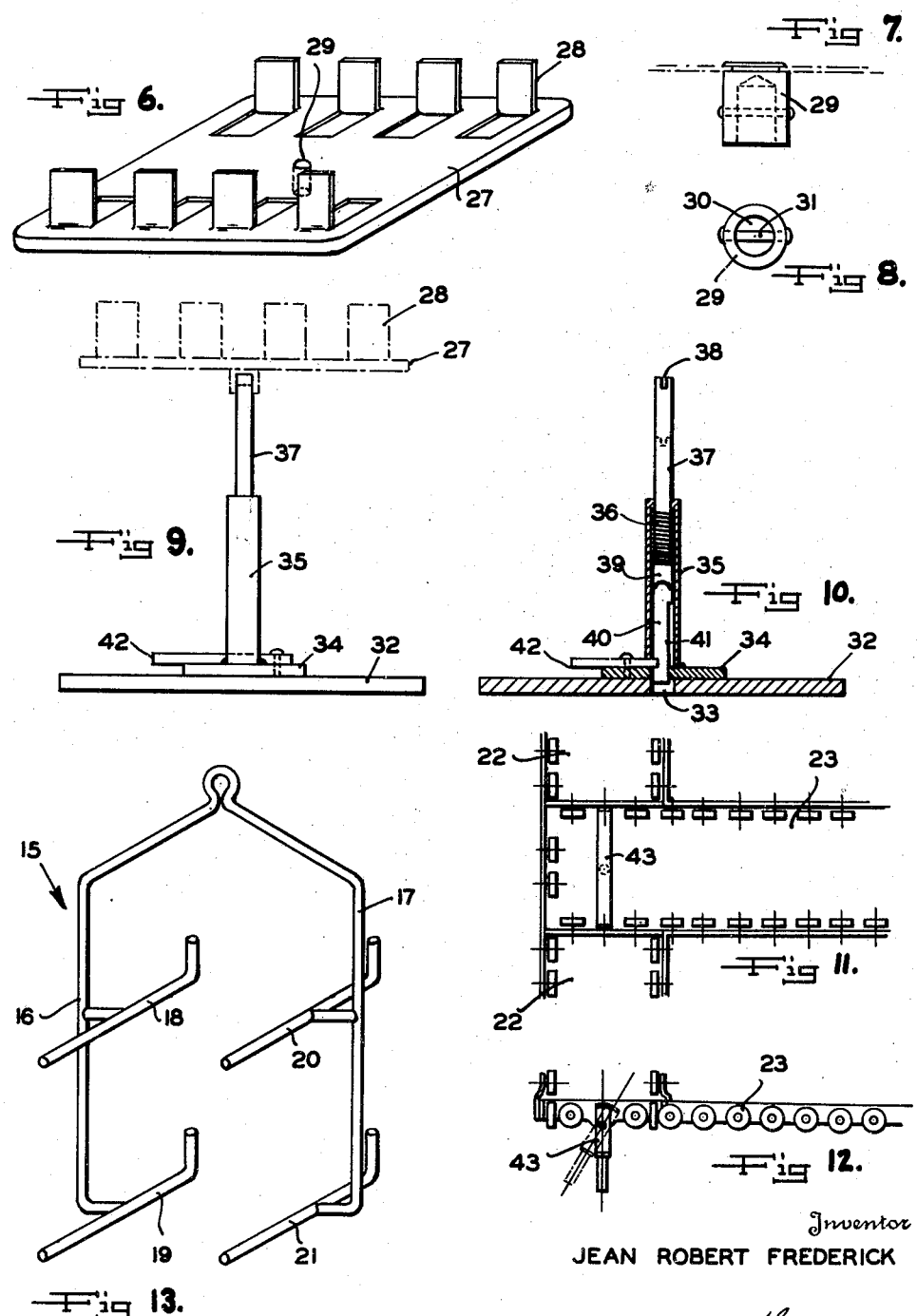
Inventor
JEAN ROBERT FREDERICK
By Francis J. Klempay
Attorney

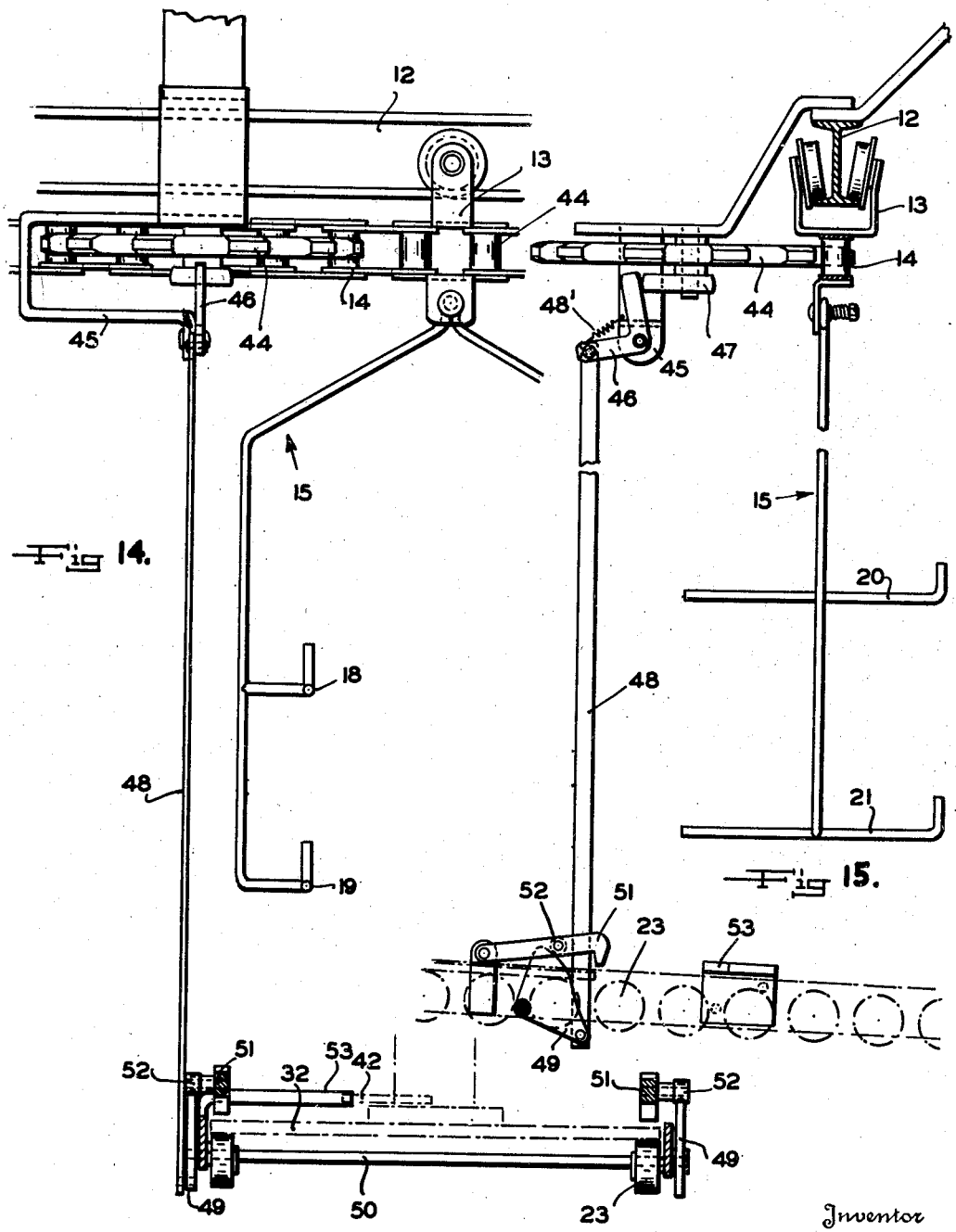

Patented Jan. 10, 1950

2,493,807

UNITED STATES PATENT OFFICE 2,493,807

TRANSFER APPARATUS FOR LOADING CONVEYERS

Jean R. Frederick, Conneaut, Ohio

Application September 13, 1947, Serial No. 773,857

8 Claims. (Cl. 198—20)

This invention relates to the general art of mechanical conveyors and more particularly to improved apparatus for transferring individual objects from a production line or a point of production activity onto a continuously moving conveyor whereby the objects may be expeditiously handled and transported for subsequent processing. Systems of this general nature have wide applicability in manufacturing establishments wherein it is essential that articles being produced or processed be moved through portions of the plant in an orderly and expeditious manner. Thus, conveyor loading systems are useful in taking articles from spray booths and loading them automatically onto a continuous overhead conveyor for transportation through a drying oven or between batteries of infra-red drying lamps and while the present invention is particularly well suited for this purpose it should be understood as the description proceeds that the features of the invention are equally applicable to other specific uses.

The primary object of the invention is the provision of an automatic article transferring assembly which is operative to load a continuous conveyor with a multiplicity of separate articles in a careful, expeditious and substantially automatic manner. In the latter regard a more specific object of the invention is the provision of an improved loading arrangement for a continuously moving article conveyor which eliminates entirely the need for any attendant to load the articles onto the conveyor. This enables a manufacturing operator to initiate an automatic sequence of transportive movements of articles being manufactured immediately upon completion of his work on the articles. For example, in a painting department an operator may initiate such automatic sequence of transportive movement to articles being coated that such articles will automatically be transported to and through a drying device in a continuous and uninterrupted manner immediately upon completion of the spraying operation.

A further object of the invention is the provision of an improved support for movably supporting an article-holding tray for passage of the tray along inclined roller conveyors and onto a tray-receiving device suspended from a continuously moving overhead conveyor.

Another object of the invention is the provision of improved mechanical apparatus for automatically transferring physical objects or article-mounting trays onto a continuously advancing longitudinal conveyor from a laterally disposed feeding conveyor.

The above and other objects and advantages of the invention will become apparent upon consideration of the following detailed specification and the accompanying drawing wherein there is disclosed a preferred embodiment of the invention.

In the drawing:

Figure 6 is a perspective view of an article-carrying tray which may be employed in the assembly of Figure 1;

Figures 7 and 8 are detailed elevation and plan views, respectively, of a mounting ferrule which may be employed for the tray of Figure 6;

Figures 9 and 10 are elevation and sectional views, respectively, of a movable tray-supporting pedestal employed in the assembly of Figure 1;

Figures 11 and 12 are schematic plan and elevation views, respectively, of a roller conveyor assembly utilized in the system of Figure 1 to movably support pedestals constructed according to the showing of Figures 9 and 10;

Figure 1:
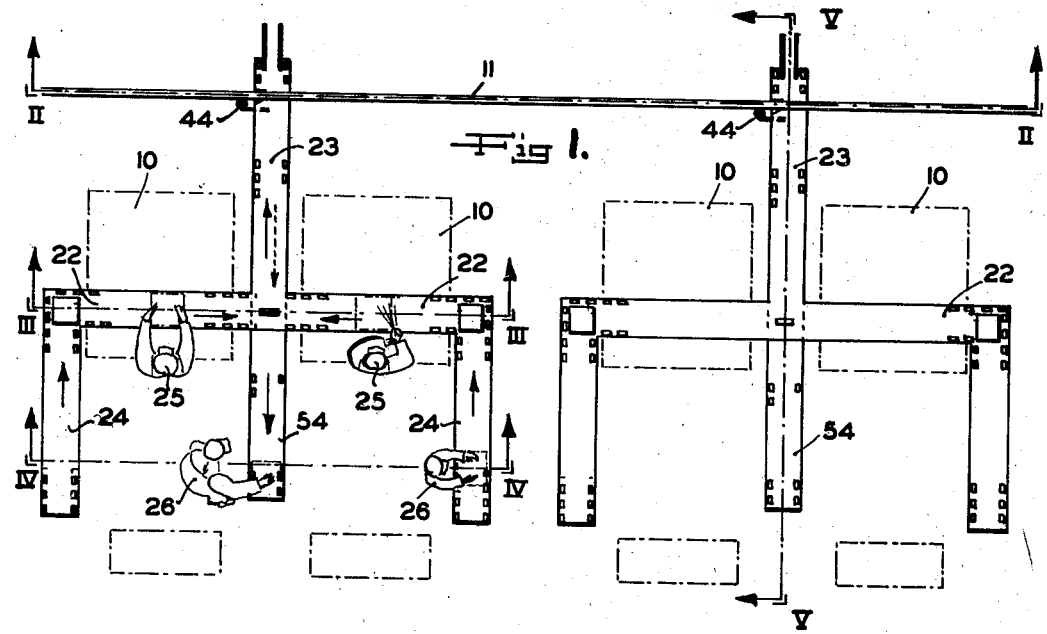
Figure 1 is a schematic plan view of a portion of a painting department of a manufacturing plant constructed in accordance with the principles of the invention.
Figure 2:
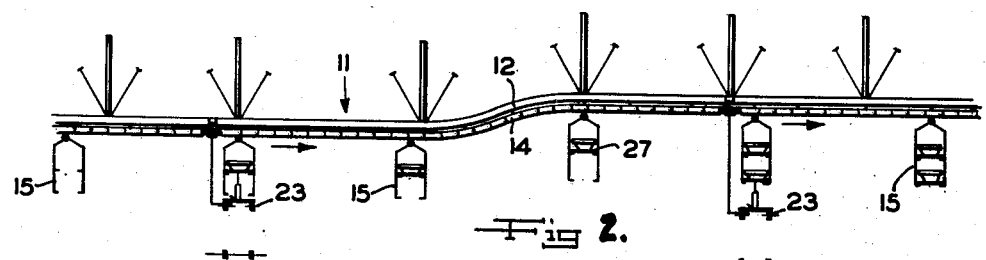
Figures 2, 3, 4 and 5 are schematic showings of elevations which appear along the lines II—II, III—III, IV—IV, and V—V, respectively, of Figure 1.
Figure 3:
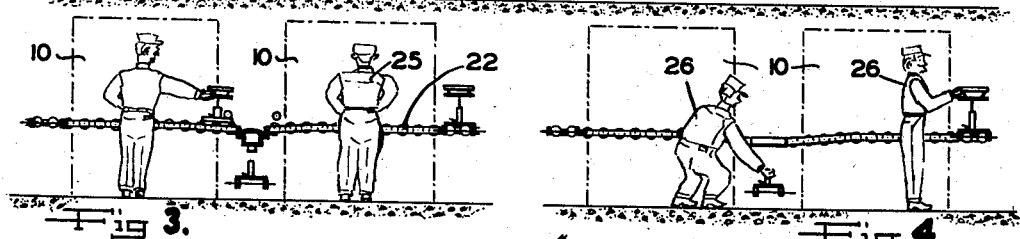
Figure 4:
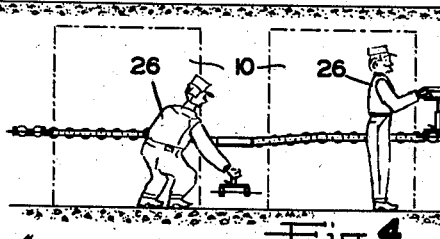

Figure 13 is a perspective view of a tray holder which depends from the continuous overhead conveyor of Figures 1 and 2; and Figures 14 and 15 are detailed side and sectional views, respectively, of a portion of the overhead conveyor of the assembly of Figures 1 and 2.

In Figures 1, 3, 4 and 5 the reference numeral 10 designates a spray booth of which there may be a substantial number in any particular plant installation. By way of illustration I have selected four such booths arranged in line and separated into two groups of two booths each. Extending longitudinally in back of the booths 10 is an overhead conveyor designated generally by reference numeral 11 and consisting of a suspended monorail 12 along which travels a plurality of spaced trolleys 13 (see Figures 14 and 15) for movably suspending a roller chain 14 and it will be understood that at curves or corners of the conveyor system suitable driving and idling sprockets, not shown, will be provided in accordance with usual practice to insure the chain 14 travelling under the rail 12 at all points thereof. Suspended from the bottom edge of the chain 14 at predetermined intervals and preferably in vertical alignment with certain or all of the trolleys 13 is a multiplicity of spaced carriers 15 each comprising an inverted U-shaped wire frame having vertical legs 16 and 17. The leg 16 carries a pair of horizontally disposed but vertically spaced rods 18 and 19 and a similar pair of rods 20 and 21 are supported by and inwardly of the leg 17 as shown in Figure 13. The various rods 18—21 extend at right angles to the plane of the legs 16 and 17 and are upturned at their ends on one side of this plane. Further, the rods 18 and 20 lie in a common horizontal plane while the rods 19 and 21 lie in a common lower horizontal plane for the support of a pair of superimposed objects or article-carrying trays to be hereinafter more fully described. As shown in Figures 2, 5, 14 and 15 the carriers 15 are mounted on the conveyor in such orientation that the plane of the two legs 16 and 17 in coincident with the direction of movement of the carriers.

Extending transversely through the fore part of each booth 10 is a roller conveyor 22 which slopes downwardly toward the space between the two booths of each pair. At this point the two roller conveyors 22 merge into a right angularly disposed roller conveyor 23 which extends laterally under the overhead conveyor 11 while sloping downwardly toward a position below the overhead conveyor. Discharging onto the outer end of each of the transverse conveyors 22 is a forwardly extending roller conveyor 24 which slopes downwardly toward the conveyors 22 and it is the purpose of these conveyors 24 to supply objects or trays of articles to be paint sprayed in the booths 10 by the spray operators shown at 25 in the drawing. Such objects and/or trays as well as the immediate carriers for the objects or trays may be prepared by operators 26 who position the assemblies on the forward ends of the roller conveyors 24. One such assembly will now be described in detail.

In the illustrated embodiment of the invention the system is set up to handle small objects as phonograph tone arms, not shown, and in order to handle these small objects in groups, I provide a multiplicity of stamped metal trays each having a flat base portion 27 and a multiplicity of upstanding lugs 28 and in practice each of the arms to be painted are supported on a spaced pair of the lugs 28. Rigidly secured to the geometric center of the plate 27 and extending therebelow is a ferrule 29 having a bore 30 across which extends a pin 31.

I also provide in the system of my invention a multiplicity of movable supports for the trays 27 each consisting of a flat square base plate 32 having a center aperture 33 and overlaid in its center portion with a disc 34 having an aperture registering with the aperture 33. Secured to and extending upwardly from the disc 34 is a tube 35 having an internal shoulder at its upper end to retain a coil spring 36. Slidably mounted in the upper end of the tube 35 is a plunger 37 having a slotted upper end 38 which is arranged to be received in the bore 30 of the ferrule 29 with the pin 31 received in the slot 38. Thus it is obvious that while the trays 37 may be readily applied to and removed from the plungers 37 the trays are effectively held against rotation on the plungers 37 by reason of the interlocking pins 31 and the slots 38. The lower ends of the plungers 37 are enlarged at 39 to provide abutments for the lower end of springs 36 whereby the plungers 37 are spring-biased in a downward direction. The lower ends of the enlargements 39 are concaved transversely to cooperate with the transversely convexed upper ends of plungers 40 which are slidably received in the lower portions of the tubes 35. While the plungers 40 are generally circular in cross-section they each have a flattened surface 41 which co-acts with a flat wall portion of the aperture in the disc 34 whereby the plungers 40 are effectively restrained from rotation in the tubes 35. Also, each of the plungers 40 has a notch in the lower portion of its side wall for receiving an edge of a lever 42 hinged on the disc 34, it being understood that the tube 35 is suitably slotted in its side wall to allow entry of a portion of the lever 42. By referring to Figure 10 it will be clear that when the lever 42 is in engagement with the slot in plunger 40 the plunger will be locked in upper position and held against rotation whereby the plunger 37 (and the tray carried thereby will be biased to either one of two oriented positions spaced 180° apart because of the co-acting transverse convex concave ends of the plungers 40 and 37, respectively. If now the lever 42 is rotated to clear plunger 40 the latter as well as the plunger 37 will be forced down rapidly by the spring 36 until the shoulder at the upper end of flat surface 41 engages disc 34. The function of this mode of operation will be explained below. The movable supports comprising the flat plates 32 which carry the trays of articles being processed move down the conveyors 22 and onto the outer ends of the right angularly disposed conveyors 23 and to assist in the transfer I provide a counterweighted and pivoted bridge 43 having a smooth curved upper surface to slidably support portions of the plates 32 as these plates progress from the conveyors 22 onto the outer ends of the conveyors 23. Immediately upon the plates being so positioned the bridge 43 tilts as suggested in Figure 12 to allow the plate or plates 32 to roll down the conveyor or conveyors 23. As explained above, the conveyors 23 extend transversely under the line of movement of the carriers 15 and to synchronize movement of the tray supports at the lower ends of the conveyors 23 with the carriers 15 whereby the trays 27 mounted on the movable supports will be automatically deposited on the carriers 15 I provide the mechanism now to be described.

Figure 5:
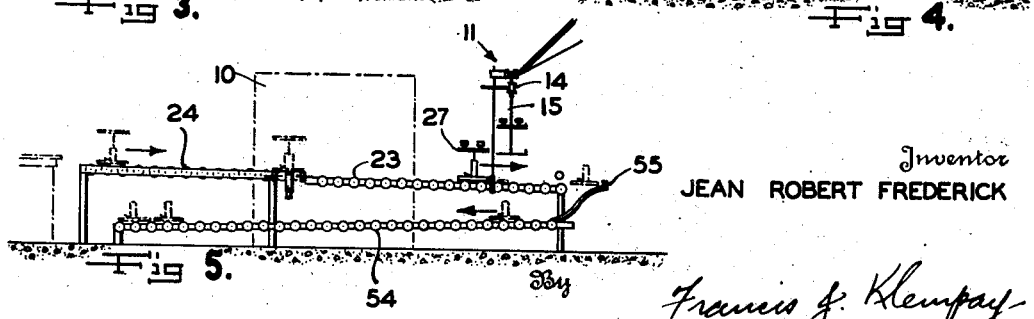

As shown in Figures 1, 14 and 15 a sprocket 44 in mesh with the chain 14 is positioned immediately ahead of each of the conveyors 23 and extending around each sprocket 44 is a bracket 45 on which is pivoted a bellcrank lever 46 arranged to be tilted in one direction (counterclockwise in Figure 15) periodically by a cam 47 carried by sprocket 44. A spring 48' biases the lever 46 in the opposite direction. Pivotally connected to the outer leg of the lever 46 and depending therefrom is a strap 48 which is pivotally connected at its lower end to one of a pair of cams 49 which are positioned on opposite sides of the conveyor 23 and rigidly interconnected by a shaft 50. An overhanging latch 51 having a cam follower 52 is pivotally mounted on each side of the conveyor 23 and by referring to Figures 14 and 15 it will be apparent that upon downward movement of the strap 28 and rotation of the cams 49 and the latches 51 will be raised to release a plate 32 of one of the movable supports the movement of which had previously been arrested by the bights of the latches 51. In assembling the plant the number of links in chain 14 between successive carriers 15 is so related to the number of teeth in each of the sprockets 44 that at each tripping of the latches 51 one of the carriers 15 will be substantially aligned with each of the conveyors 23 so that upon resumption of movement of the movable tray-carrying supports on the conveyors 23 the trays on the supports will move onto one or the other of the two pairs of rods 18—21 of the carriers 15. It should be noted that the upturned far ends of the rods 18—21 will arrest continued movement of the trays transversely of the vertical plane of the principal overhead conveyor. As this relative position of the trays is reached an arm 53 overhanging each of the conveyors 23 behind the latches 51 will engage the levers 42 of the supports moving down the conveyors 23 to rotate the levers 42 out of the notches in the plungers 41 to allow the plungers 37 to snap downwardly free and clear of the trays 27 whereby the latter are automatically deposited on the carriers 15. Figure 5 shows the relative positions of the parts when a tray 27 is about to be loaded onto one of the carriers 15.

It will be obvious that the article-carrying trays may be loaded either onto the upper pairs of rods 18, 20 or the lower pairs of rods 19, 21 of the carriers 15. This double arrangement is provided in order to increase the load-carrying capacity of the principal conveyor 11 and by referring to Figure 2 it will be observed that suitable arrangement is made for loading the trays from one of the conveyors 23 onto the upper of the rods of each carrier 15 while the trays coming from the other of the conveyors 23 is loaded onto the lower rods of the carriers 15. This effective arrangement may be accomplished either by varying the elevations of the conveyors 23 or by stepping up the level of the conveyor 15 as illustrated in Figure 2.

After the movable supports comprised of the plates 32 and plungers 37 have been relieved of their trays by the carriers 15 these supports may be diverted onto lower return roller conveyors 54 by chutes 55. As shown in Figure 5, the conveyors 54 slope downwardly to the working area of the operators 26 who re-set the movable supports by moving the plungers 33 upwardly and re-set levers 42 after which the supports may be positioned on the conveyors 24 with article-loaded trays mounted thereon. The assemblies thus completed are then transferred to the operators 25 who spray the articles or perform other operations thereon and it will be understood that the provisions made for allowing the trays and plungers 37 to be rotated is particularly advantageous in these operations. Further, the interlocking curved surfaces of the members 39 and 40 insure that the trays will always be properly oriented for reception in the carriers 15 as the carriers are approached.

It should now be apparent that I have provided an improved mechanical conveyor system which accomplishes the objects initially set out. By the use of the invention it is possible with a minimum number of operators to process in continuous production lines large quantities of separate articles and to thereafter load the articles onto an efficient and continuously moving conveyor in a substantially automatic manner whereby further economies are effected in the operations of a plant. It should be understood, however, that the above specifically described embodiment of the invention is illustrative only as obviously many changes may be made therein without departing from the spirit or scope of the invention. Reference should therefore be had to the appended claims in determining the scope of the invention.

What I claim is:

1. In combination with a conveyor arranged for continuous movement and having a plurality of spaced tray-receiving carriers, a cross-conveyor extending transversely to said first mentioned conveyor, a portable support transportable on said cross-conveyor and mounting an article loaded tray, means to correlate the positions of said carriers with said supports as said supports cross the path of movement of said carriers whereby the trays mounted on said supports may be automatically transferred to said carriers, and means to automatically release said supports from said trays upon said trays being positioned in said carriers.

2. Apparatus according to claim 4 further characterized in that said carriers each comprises means to support said trays on either of two vertically spaced levels, a second cross-conveyor spaced from said first mentioned cross-conveyor, and means to vary the elevation of said carriers with respect to the respective cross-conveyors whereby the trays coming from one cross-conveyor will be loaded on one level of the carriers while the trays coming from the other of the cross-conveyors will be loaded onto the other level of said carriers.

3. Apparatus according to claim 4 further including a return conveyor positioned below said cross-conveyor, and means to automatically transfer said portable tray supports from said cross-conveyor to said return conveyor after the tray on said support has been transferred to one of said carriers.

4. In an article-conveying system for a plant installation having a plurality of article-processing stations arranged in aligned side-by-side relation, an overhead continuous conveyor having spaced depending carriers extending parallel across the rear of said stations, a roller conveyor extending laterally across each of said stations, cross-roller conveyors connecting with the discharge ends of said first mentioned roller conveyors and extending to positions below said overhead conveyor, and portable supporting means movable on said roller conveyors and being operative to transfer articles from said stations onto said carriers.

5. In combination with a conveyor arranged for continuous operation and having a plurality of spaced tray-receiving carriers, a conveyor extending crosswise of said first mentioned conveyor, means on said cross-conveyor to movably support article-holding trays to be transferred to said carriers, and means to automatically correlate the positions of said carriers with respect to the positions of said supports as the latter approach the path of movement of said carriers whereby said trays may be automatically transferred from said supports to said carriers, said cross-conveyor comprising a roller conveyor and said supports each comprising a flat plate transportable on said roller conveyor and having an upwardly projecting but centrally disposed member for removably supporting an article-loaded tray.

6. A conveyor system comprising an overhead rail, spaced wheeled dollies mounted on said rail, a continuous link chain supported in depending relation by said dollies with the hinge pins of said chains extending vertically, a plurality of spaced carriers suspended from the bottom edge of said chain, a cross-conveyor extending transversely below the path of movement of said carriers, and means to automatically transfer article-carrying trays supported on and moving along said cross-conveyor onto said carriers in succession; said means to transfer comprising a portable support for each of said trays on said cross-conveyor, a stop to arrest the movement of said supports at a predetermined position on said cross-conveyor, and a sprocket in mesh with said chain and mounting a cam operative to retract said stop whereby one of said tray-carrying supports will pass under each of said carriers as said carriers move in succession across said cross-conveyor.

7. A conveyor system comprising an overhead rail, spaced wheeled dollies mounted on said rail, a continuous link chain supported in depending relation by said dollies with the hinge pins of said chains extending vertically, a plurality of spaced carriers suspended from the bottom edge of said chain, a cross-conveyor extending transversely below the path of movement of said carriers, and means to automatically transfer article-carrying trays supported on and moving along said cross-conveyor onto said carriers in succession; said means to transfer comprising a plurality of portable supports movable on said cross-conveyor and each having a centrally disposed upstanding member adapted to have socketed interengagement with one of said trays, each of said carriers having a plurality of spaced tray-receiving rods extending horizontally and generally parallel with the longitudinal axis of said cross-conveyor.

8. A portable tray-supporting device for use on a roller conveyor comprising a base member having a flat lower surface, a tubular member secured to and projecting upwardly from said base member, a plunger slidably and rotatably received in said tubular member and having an upper end adapted to have socketed interengagement with an article-supporting tray, a second plunger in said tubular member below said first mentioned plunger and slideably mounted in said tubular member, means to restrain rotation of said second plunger in said tubular member, releasable means to retain second plunger in an upper position in said tubular member, said plungers having mutual end contact with the contiguous ends formed transversely in such manner that said first mentioned plunger is biased to predetermined rotational positions, and spring means biasing said first mentioned plunger in downward direction.

JEAN R. FREDERICK.

REFERENCES CITED

The following references are of record in the file of this patent:

UNITED STATES PATENTS

| Number | Name | Date |
| --- | --- | --- |
| 818,005 | Turner et al. | Apr. 17, 1906 |
| 964,394 | Coddington | July 12, 1910 |
| 1,550,248 | Gehnrich | Aug. 18, 1925 |
| 1,969,122 | De Witt | Aug. 7, 1934 |
| 2,199,061 | Young et al. | Apr. 30, 1940 |
| 2,255,922 | Finston | Sept. 16, 1941 |